3,066,123
ACTIVATED FRIEDEL-CRAFTS CATALYSTS FOR POLYMERIZATION

Herbert F. Strohmayer, Roselle, Leon Sherwood Minckler, Jr., Metuchen, Joseph P. Simko, Jr., Highland Park, and Eugene L. Stogryn, Fords, N.J., assignors to Esso Research and Engineering Company, a corporation of Delaware
No Drawing. Filed Sept. 10, 1958, Ser. No. 760,074
3 Claims. (Cl. 260—93.1)

This invention relates to an improved method of polymerizing Type II and Type III unsaturated hydrocarbons. More particularly it relates to a process of this nature utilizing activated Friedel-Crafts catalysts and the products produced thereby.

The low pressure polymerization and copolymerization of alpha olefins and diolefins with catalyst systems made up of a partially reduced, heavy transition metal halide and a reducing metal-containing compound to high density, often isotactic, high molecular weight, solid, relatively linear products is now well known.

These systems employ the reducing compound in excess of equimolar amounts and usually in large excess, e.g. see Ziegler Belgian Patent No. 533,362. These catalysts, however, do not readily polymerize Type II and Type III olefins, particularly olefins such as isobutylene. The structure of these olefins is shown below:

Type II     RCH=HCR'

Type III    R(R')C=CH$_2$ (see C. E. Boord, The Science of Petroleum, volume 2, p. 1349, Oxford University Press, New York (1938). Conversely, most Friedel-Crafts catalysts such as stannic chloride are known to be ineffective as Ziegler catalysts.

It has now been found that unsaturated hydrocarbons having at least 3 carbon atoms selected from the group consisting of Type II and Type III alkenes, alkadienes, cycloalkenes and cycloalkadienes can be polymerized in the presence of a catalyst system of a Friedel-Crafts compound and an aluminum alkyl compound, the molar ratio of Friedel-Crafts compound to aluminum alkyl being a minimum of one.

It is surprising that this invention proceeds in the manner listed since the Friedel-Crafts compounds alone or the aluminum alkyl compounds alone are much less effective. The combination of the two is also ineffecitve for polymerizing ethylene except in the Ziegler system in the proper numerical ratios. On the other hand, unlike the Ziegler type catalysts which are ineffective for isobutylene, the novel catalyst systems give extremely rapid, exothermic polymerization with very high catalyst efficiencies.

The unsaturated hydrocarbons that can thus be utilized in polymerization and copolymerization include, by way of example, propylene, norbornadiene, isobutylene, dicyclopentadiene, 2-methyl-1-butene, dipentene, 2-ethyl-1-butene, 2-methyl-1-pentene, diisobutylene, 4-vinylcyclohexene, norbornylene, isoprene, butadiene, piperylene, dimethylbutadiene, cyclopentadiene.

Copolymers and tripolymers of olefins; and olefins and dienes can also be prepared by these catalysts. Examples are: isobutylene-styrene; isobutylene-isoprene; isobutylene-cyclopentadiene; isobutylene-2-methyl-1-pentene; isobutylene-butadiene, etc. The rubbery polymers which contain unsaturation can be vulcanized with sulfur, together with accelerators, fillers, etc., that is, by well known curing processes especially those effective for butyl rubber. Modified polymers through halogenation, etc. may also be prepared. It is to be understood that wherever the term "polymer" is used herein, it connotes both homo- and copolymers.

The Friedel-Crafts component of the catalyst system can be any one of these components known in the art, e.g. see Schildknecht, "Vinyl and Related Polymers," Wiley (1952), page 541. These materials include $HgCl_2$, $BeCl_2$, $ZnCl_2$, $ZnBr_2$, $CdCl_2$, $CaCl_2$, $BF_3$, $BCl_3$, $BBr_3$, $AlCl_3$, $AlBr_3$, $AlI_3$, $GaI_3$, $TiCl_4$, $TiBr_4$, $ZrCl_4$, $ZrBr_4$, $SnCl_4$, $SnBr_4$, $SbCl_3$, $SbCl_5$, $MoCl_5$, $BiCl_3$, $FeCl_3$, $UCl_4$. It should be noted that these materials when employed alone are not as effective, and as stated previously, many of them, such as stannic chloride, are completely ineffective in Ziegler type catalysis.

The activating material must be an aluminum alkyl compound which has been found to be absolutely essential in the combination although ineffective alone. The alkyl component of the alkyl aluminum compound preferably has from one to eight carbon atoms. One or two of the alkyl components can be replaced by halogen atoms so that the formula of the alkyl aluminum compound can be stated as RR'AlX Specific examples of preferred alkyl aluminum compounds include $AlEt_3$, aluminum triisobutyl, $AlEt_2Cl$, aluminum sesqui chloride, $AlEtCl_2$, $AlEtBr_2$, $AlEt_2Br$, $AlEtI_2$, $AlEt_2I$, $AlMeCl_2$, $AlMe_2Cl$, $AlMeBr_2$, $AlMe_2Br$, $AlMeI_2$, $AlMe_2I$, $AlMe_3$.

A particularly effective catalyst system is made up of stannic chloride and aluminum triethyl.

It is extremely important that the molar ratio of Friedel-Crafts compound to aluminum be a minimum of one. This excess of Friedel-Crafts compound is required to get polymerization. Thus, for example, in the case of isobutylene polymerization with varying ratios of aluminum triethyl to stannic chloride, the following data were obtained on catalyst activity.

| Al/Sn ratio: | Catalyst activity |
|---|---|
| 0.5 | Active. |
| 1.0 | Do. |
| 1.5 | Inactive. |
| 2.0 | Do. |
| 0.5 | Active (reactivated). |

The active (reactivated) refers to the fact that increasing the aluminum to tin ratio deactivated the catalyst when that ratio exceeded 1. However, the system was reactivated by the addition of stannic chloride so that the concentration of the latter exceeded that of the aluminum. This differs from the Ziegler quantitative relationships employed. It has also been found that stannous chloride is ineffective in this invention, again illustrating a difference in mechanism.

The concentration of monomer in the diluent can be in the range of 5–100%, preferably 25–75%. The catalyst concentration employed is in the range of 0.1–10 g./100 g. feed, preferably 0.3–2 g.

The ingredients for the catalyst system can be mixed in a variety of ways. These include, e.g.:

(1) Addition of olefin to premixed stannic chloride plus aluminum triethyl;

(2) Addition of aluminum triethyl to premixed stannic chloride and olefin;

(3) Addition of premixed stannic chloride plus aluminum triethyl to olefin feed.

The first method has generally been employed for the higher temperatures of polymerization, whereas the second and third methods are most often used for low temperature polymerizations, although they can be interchanged to the extent that proper control of vigorous reactions can be maintained.

The polymerization is generally carried out in hydrocarbon solvents, preferably aliphatic, e.g. pentane, heptane, cyclohexane, isooctane, etc. at temperatures of about −25° C. to 100° C., preferably 0° to 50° C. At low temperatures, −150° C. to −25° C., an alkyl halide solvent is preferable. The pressures that can be utilized are in the range of atmospheric at 100 atm. The alkyl halide solvents such as methyl chloride, ethyl chloride, ethylidene difluoride and methylene dichloride can also be used at the higher temperatures.

When the desired degree of polymerization has been reached the mixture is quenched with alcohol, water, acetone, etc. (compounds which destroy the catalyst system); separated by precipitation with non-solvents such as alcohol and acetone, and dried by distillation or heating in vacuum. Further details follow.

The polymers produced ranged from high molecular weight rubbers to viscous oils. Thus the isobutylene polymer is of generally higher molecular weight than obtained by ordinary acid or Lewis acid polymerization. These systems are less temperature sensitive. Polymerized norbornadiene (bicycloheptadiene), believed to be a novel composition of matter having a melting point above 300° C., has been obtained by the process of this invention.

The characteristics of other polymers appear in the examples. This invention and its advantages will be better understood by reference to the following examples.

EXAMPLE I

Isobutylene was polymerized with various combinations of aluminum triethyl and stannic chloride, the conditions and results being shown in the following table:

Table I
POLYMERIZATION OF ISOBUTYLENE WITH AN ALUMINUM TRIETHYL-STANNIC CHLORIDE CATALYST SYSTEM

| Example | 1 | 2 | 3 | 4 | 5 | 6 | 7 |
|---|---|---|---|---|---|---|---|
| Catalyst | $SnCl_4$ | $AlEt_3/SnCl_4$ | $ZnEt_2/SnCl_4$ | $AlEt_3/SnCl_4$ | $AlEt_3/SnCl_4$ | $AlEt_3/SnCl_4$ | $AlEt_3/SnCl_4$ |
| Al/Sn ratio | | 0.5 | 0.5 (Zn/Sn) | 0.5 | 0.5 | 0.5 | 0.5 |
| Weight percent $SnCl_4$ in solvent | 1.1 | 1.1 | 1.1 | | 0.4 | 0.1 | 0.1 |
| Solvent | Isooctane | Isooctane | Isooctane | | Methyl chloride | Methyl chloride | Methyl chloride |
| Temperature, °C | 20 | 20+ | 15 | −78 to 0 | −35 | −100 | −23+ |
| Viscosity average molecular weight | | 7,300 | | 520,000 | 576,000 | 1,786,000 | 83,400 |

Column 1 demonstrates the necessity for an activating material for stannic chloride. Column 3 shows the necessity of an aluminum alkyl in that other metal alkyls, e.g. zinc diethyl doesn't work. Column 2 and columns 4 through 7 demonstrate how the product characteristics can be varied with conditions.

EXAMPLE II

Various olefins were polymerized with various combinations of aluminum triethyl and stannic chloride at room temperature. The results appear in Table II below.

Table II
POLYMERIZATION OF VARIOUS OLEFINS WITH AN ALUMINUM TRIETHYL-STANNIC CHLORIDE CATALYST SYSTEM
[Room temperature +]

| Monomer | Catalyst (ratio) | Remarks |
|---|---|---|
| Dicyclopentadiene | $AlEt_3/2SnCl_4$ | White solid polymer with melting point above 300° C. |
| Norbornadiene | $AlEt_3/2SnCl_4$ | Do. |
| Do | $SnCl_4$ | No polymer. |
| Do | $AlEt_3$ | Do. |
| Do | $SnCl_2$ | Do. |
| Do | $AlEt_3/SnCl_2$ | Do. |
| Do | $AlCl_3$ | Do. |
| Do | $Bu_2SnCl_2$ | Do. |
| Do | $Bu_3SnCl$ | Do. |
| Do | $Bu_3SnCl/SnCl_4$ | Do. |
| 2-methyl-1-butene | $AlEt_3/2SnCl_4$ | Heavy oily polymer obtained. |
| Diisobutylene (2,4,4-trimethyl-pentene-1) | $AlEt_3/2SnCl_4$ | Viscous oil obtained, 2.2 g. stannic chloride in 100 cc. isooctane. |

These results show the necessity of both components of the catalyst system and the uniqueness of an aluminum alkyl. It also demonstrates that the system works on Type II and Type III olefins generally.

EXAMPLE III

Isobutylene was polymerized with titanium tetrachloride and aluminum triethyl. The results are reported in Table III.

Table III
POLYMERIZATION OF ISOBUTYLENE WITH AN ALUMINUM TRIETHYL-TITANIUM TETRACHLORIDE CATALYST SYSTEM

| Run | 1 | 2 | 3 | 4 | 5 | 6 | 7 | 8 | 9 | 10 |
|---|---|---|---|---|---|---|---|---|---|---|
| Catalyst: | | | | | | | | | | |
| Ti component | $TiCl_3$ (0.3 $AlCl_3$) | $TiCl_4$ | $TiCl_4$ | $TiCl_4$ | $TiCl_4$ | $TiCl_4$ | $TiCl_4$ | $TiCl_4$ | $TiCl_4$ | $TiCl_3$. |
| Al/Ti ratio | 3 | 3 | 0.5 | 0.05 | 0.5 | 0.5 | 0.5 | 0 | 0 | .5. |
| Con. Ti halide, percent | 0.4 | 0.4 | 1.6 | 1.6 | 1.6 | 0.8 | 0.15 | 0.8 | 0.8 | 1.3. |
| Temp., °C | 30 | 30 | 35 | 45 | 20 | 0 | 0 | 0 | 10 | 25. |
| Time, hrs | 1 | 1 | 2 | 2 | 0.5 | 1.5 | 1.25 | 1 | 0.5 | |
| Yield of Polymer, percent | 0 | 0 | 84 | 78 | 58 | 79 | 70 | 0 | 0 | 0. |
| Viscosity average molecular weight | | | 6.6 | 2.8 | 5.4 | 40 | 50.4 | | | |

This table shows that unlike the Ziegler systems, excess titanium tetrachloride is required for isobutylene polymerization. On the other hand, titanium trichloride, or a reduced transition metal compound which constitutes one of the best components for the Ziegler catalyst, was ineffective. This again demonstrates the difference in the catalyst and the results obtained.

The advantages of this invention will be apparent to those skilled in the art. Rapid polymerization is achieved with monomers that normally polymerize with similar catalyst systems only with difficulty. This can produce novel products. The products obtained furthermore have high purity and are relatively colorless. The molecular weight of the products is not as temperature sensitive as those produced by related processes permitting the preparation of higher molecular weight polymers at higher temperatures.

The catalysts of this invention can also be used for the preparation of isobutylene-conjugated diolefin, e.g. isoprene and butadiene copolymers.

It is to be understood that this invention is not limited to the specific examples which have been offered merely as illustrations and that modifications may be made without departing from the spirit of the invention.

What is claimed is:

1. A process for polymerizing norbornadiene with a Friedel-Craft catalyst and an aluminum alkyl compound, the molar ratio of Friedel-Crafts catalyst to aluminum alkyl being a minimum of one.

2. The process of claim 1 in which the Friedel-Crafts catalyst is stannic chloride.

3. The process of claim 2 in which the aluminum alkyl catalyst is aluminum triethyl.

References Cited in the file of this patent

UNITED STATES PATENTS

| | | |
|---|---|---|
| 1,671,517 | Edeleanu et al. | May 29, 1928 |
| 1,720,929 | Staudinger et al. | July 16, 1929 |
| 2,237,825 | Ralston et al. | Apr. 8, 1941 |
| 2,379,687 | Crawford et al. | July 3, 1945 |
| 2,503,972 | Simons | Apr. 11, 1950 |
| 2,910,461 | Nowlin et al. | Oct. 27, 1959 |

FOREIGN PATENTS

| | | |
|---|---|---|
| 701,211 | Great Britain | Dec. 23, 1953 |

OTHER REFERENCES

Calloway: Chemical Reviews, vol. 17, pages 374–5 (1953).

Kashtanov: Chemical Abstracts, vol. 27, page 975 (1953).

Gaylord et al.: Linear and Stereoregular Addition Polymers, pp. 368, 370, 372, 374 (1959), Interscience Publishers, Inc., New York, N.Y.